July 5, 1966 A. B. PAGEL 3,259,043
FLASH BULB INDICATOR FOR PHOTOGRAPHIC CAMERA
Filed Jan. 22, 1965 2 Sheets-Sheet 1

Armin B. Pagel
INVENTOR.

BY
ATTORNEYS

July 5, 1966   A. B. PAGEL   3,259,043
FLASH BULB INDICATOR FOR PHOTOGRAPHIC CAMERA
Filed Jan. 22, 1965   2 Sheets-Sheet 2
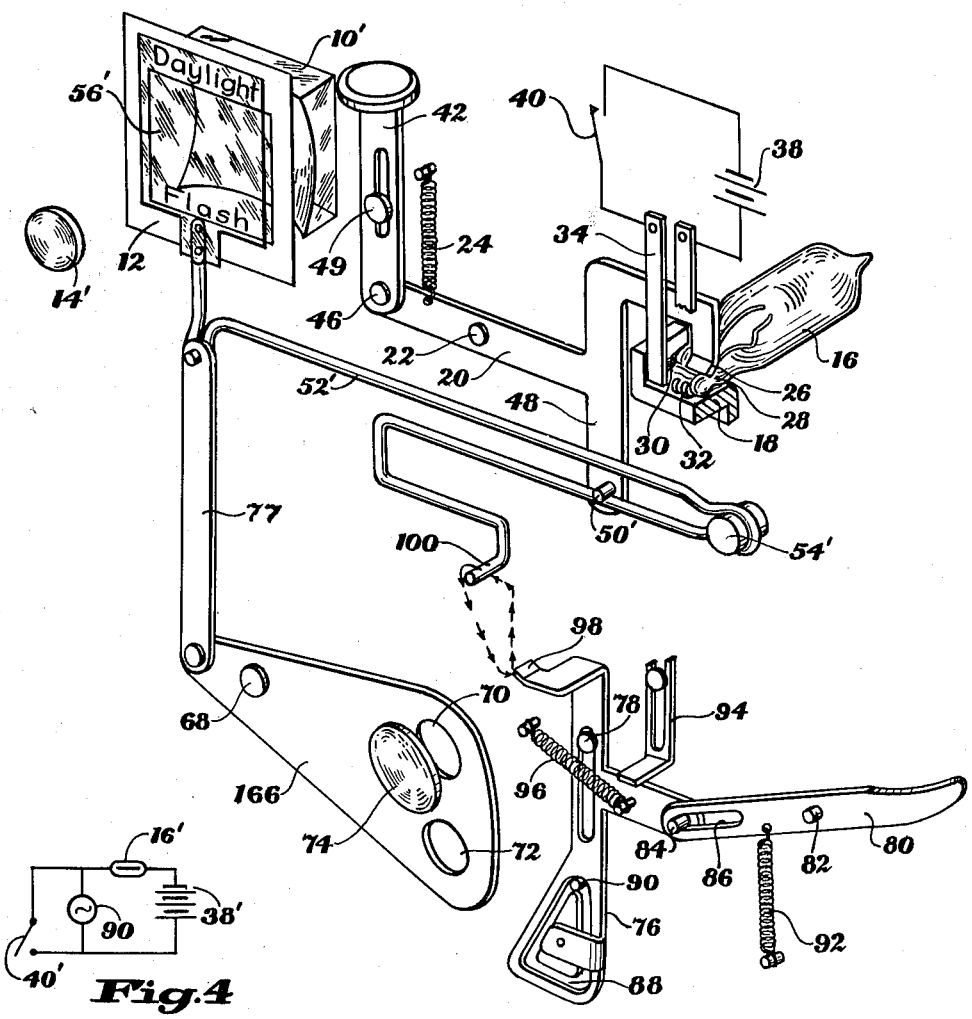
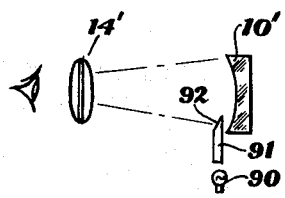
Armin B. Pagel
INVENTOR.

United States Patent Office 3,259,043
Patented July 5, 1966

3,259,043
FLASH BULB INDICATOR FOR PHOTOGRAPHIC CAMERA
Armin Booth Pagel, Janesville, Wis., assignor to Eastman Kodak Company, Rochester, N.Y., a corporation of New Jersey
Filed Jan. 22, 1965, Ser. No. 427,362
11 Claims. (Cl. 95—11.5)

The present invention relates to photographic cameras, and more specifically to cameras provided with electric flash illumination devices. Still more specifically the invention relates to such cameras having indicator and/or exposure control means responsive to the presence or absence of a fresh flash lamp in the socket of a built-in flash unit. This application is a continuation of application Serial No. 183,269, filed Mar. 28, 1962, now abandoned.

One of the most common errors made by photographers using flash equipment occurs when the photographer, intending to take a flash illuminated picture, makes an exposure and then finds that he has forgotten to first install a fresh flash lamp in the lamp socket. This, of course, results in greatly underexposing and hence ruining the exposure.

Accordingly, the present invention has as a primary object the prevention of this error by incorporating in the camera viewfinder a signal for alerting the photographer as to whether or not he is prepared to make a flash exposure. Another object of the invention is to incorporate such signal means in a camera by means of a simple, reliable and inexpensive mechanism. Still another object of the invention is to provide such a device in a camera without disturbing the function of any of the other camera elements. Yet another object of the invention is to provide such means which are adaptable to a wide variety of cameras and to the different types of lamps used therewith.

Aside from the failure of the photographer to install a fresh lamp prior to making an exposure, another common cause of faulty exposure results from the failure of the operator to properly set the shutter speed and/or diaphragm opening prior to taking a picture. In simple box-type cameras, for example, a water-house stop is often provided to enable the selection of either of two diaphragm openings, the larger opening for flash pictures and the smaller opening for daylight exposures. If the photographer fails to use the larger opening for flash pictures, underexposure is apt to result. Likewise, if after having used the large aperture for a flash exposure, the user forgets to reset the stop to the smaller opening, subsequent daylight pictures are apt to be overexposed. A similar situation also occurs where the shutter speed is adjustable rather than, or in addition to, the diaphragm opening. Another object of the present invention, therefore, is to automatically adjust the diaphragm opening and/or the shutter speed of a camera in response to the presence or absence of a fresh flash lamp in the lamp socket.

These and other important objects of the invention will be readily apparent from the following description, reference being made to the accompanying drawings in which:

FIG. 3 is a perspective view corresponding to FIG. 1, showing a means for adjusting the diaphragm opening in response to the presence or absence of a fresh lamp in the socket;

FIG. 4 is a circuit diagram of another type of flash indicator where a signal lamp is illuminated when a good flash lamp is in the socket; and FIG. 5 is a schematic view of a viewfinder showing how the light from the signal lamp in the circuit of FIG. 4 can be made to appear in the viewfinder when illuminated.

Figure 1:
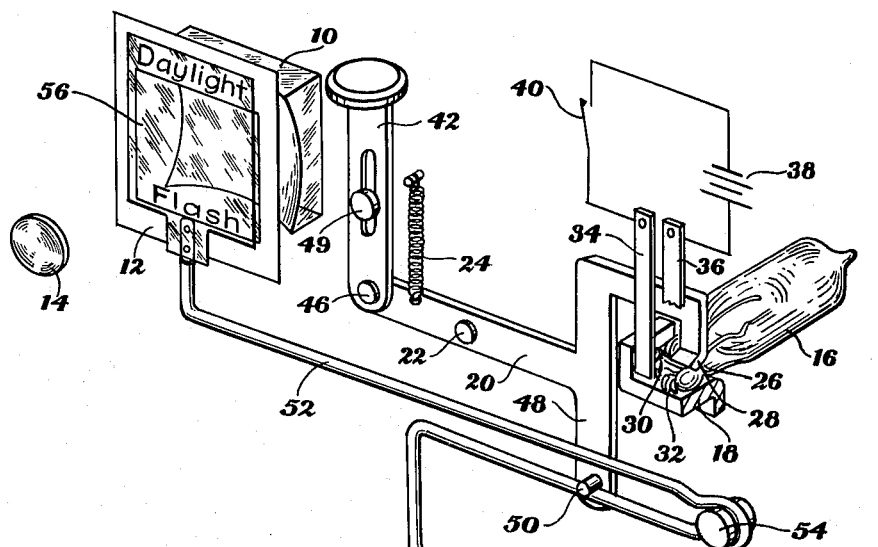
FIG. 1 is a perspective schematic view of a mechanism for providing a signal in a camera viewfinder to indicate the presence or absence of a fresh flash lamp in a lamp socket incorporated in the camera.

Referring now to FIG. 1, a device according to a preferred embodiment of the invention may be installed in a camera having a viewfinder comprising a negative front lens 10, an opaque mask 12 and an eyepiece lens 14; and provided with means for receiving a flash lamp 16. Although for purposes of simplicity and clarity, the drawings illustrate only those elements of the camera that are essential to an understanding of the invention, it should be understood that these and other components are supported by a nonillustrated camera housing.

In the illustrated embodiment, the flash lamp 16 is supported in a socket comprising a fixed socket member 18 and a movable lamp engaging lever 20 pivotally mounted to the camera housing at 22 and urged in a clockwise direction by a tension spring 24, whereby the inclined lip 26 of member 20 engages a recess 28 in the lamp base to hold the base against member 18 with the lamp terminals 30 and 32 in electrical engagement with resilient contact straps 34 and 36, respectively, which in turn are electrically connected in series with a source of voltage 38 and a flash synchronizing switch 40 associated with the camera shutter. As the base of the lamp is thrust into the socket, the inclined profile of lip 26 causes it to cam over the end of the bulb base by rotating member 20 in a counterclockwise direction about pivot 22. To eject a lamp, lip 26 is raised out of engagement with the lamp base by depressing a lamp ejecting member 42, slidably mounted on the camera housing at 49, and pivotally attached to lever 20 at 46, whereupon the resilient contact straps 34 and 36 urge the lamp forward and out of the socket.

An arm 48 of lever 20 adjacent socket member 18 carries a pin 50, straddled by a bifurcated member 52, which in the illustrated embodiment is formed of resilient wire and is pivotally mounted on the camera body by a bearing pin 54 in such a manner as to provide sufficient frictional drag to maintain it in any selected position.

Figure 2:
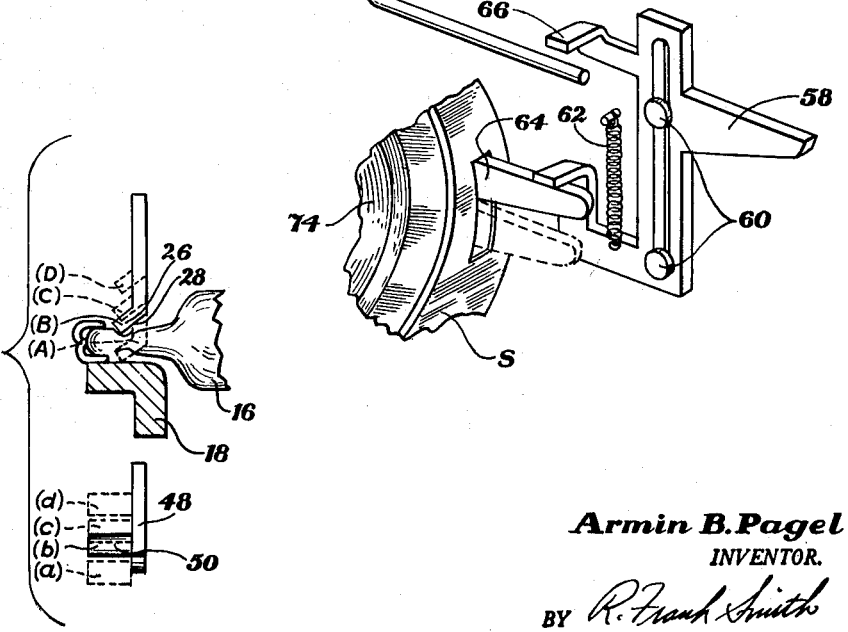
FIG. 2 is a schematic cross sectional view of the lamp socket with a lamp therein, illustrating the positions assumed by the movable lamp engaging member.

As shown in FIG. 2, lip 26 assumes four different positions during the operation of the camera, namely; dotted line position (A) when no lamp is present in the socket; full line position (B) when a lamp is retained in the socket by lip 26; dotted line position (C) as the lip is cammed over the base of the lamp during the installation thereof in the socket; and dotted line position (D) when lamp ejecting member 42 is depressed to eject a lamp. In each of these positions, pin 50 assumes four corresponding positions designated in FIG. 2 as (a), (b), (c), and (d), respectively.

In the position shown in FIG. 1, the lower arm of the bifurcated member 52 is in contact with pin 50 in position (b), and a movable transparent mask 56, attached to the end of the upper arm of member 52 is so positioned relative to finder mask 14 as to cause the word "flash" printed on the transparent mask, to be visible in the viewfinder.

When no lamp is present in the socket, pin 50 assumes position (a), thereby rotating member 52 in a counterclockwise direction about pivot 54 to move the transparent mask from the position in which the word "flash" is visible at the bottom of the viewfinder to a position in which the word "daylight" is visible at the top of the viewfinder. When a fresh bulb is thrust into the socket, lip 26 and pin 50 move to their respective positions (C) and (c). In so moving, pin 50 engages the upper arm of member 52 and moves the member to position the word "flash" in the viewfinder. As lip 26 drops into position (B) in the slot or recess 28 in the base of the lamp, pin 50 moves from position (c) in contact with the upper arm of member 52 and into position (b) adjacent the lower arm as shown in FIG. 1. This movement of the pin, however, does not disturb the position of member 52 and mask 56 due to the freedom of movement of the pin between the arms of member 52. If the lamp is installed not by merely thrusting it into the socket, but rather by depressing lamp ejecting member 42, inserting the bulb, and then releasing the lamp ejecting member, pin 50 is initially moved to position (d), thereby moving the transparent mask to bring the word "flash" into view at a position above that shown in FIG. 1. After the lamp has been inserted and member 42 released, however, pin 50 again assumes position (b), and in so doing returns member 52 and mask 56 to the position shown in FIG. 1. Thus it is apparent that installing a fresh lamp in the socket always moves mask 56 to bring the word "flash" into view in the view finder, and that the word "daylight" is always visible in the viewfinder when no lamp is present in the socket.

A shutter release element 58 is slidably mounted on the camera housing by rivets 60 and is movable against the resistance of a spring 62 into moving engagement with shutter trigger 64 which actuates a conventional camera shutter S, which may include the taking lens 74, when displaced from the solid line position to the position shown in broken lines. During such movement of the shutter release element, an arm 66 thereof engages the adjacent lower end of member 52 to rotate the same in a counterclockwise direction about pivot 54 to return mask 56 to the "daylight" position, indicating that the lamp has been fired.

From the foregoing, then, it is apparent that the word "flash" will appear in the viewfinder only when a lamp has been installed in the socket and has not yet been fired, and that the word "daylight" will appear in the viewfinder at all other times. It should be pointed out that the invention is not limited to the idea of the mask 56 including the "daylight" to indicate that there is no lamp in the socket or that the one in the socket has been fired. It is obvious that the "daylight" designation might be left off the top of mask 56 so that merely the absence of the word "flash" in the viewfinder would indicate that the camera is not ready for flash work but only for daylight exposures.

In order to prevent damage to the mechanism in the unlikely event that both ejecting member 42 and shutter release element 58 are simultaneously depressed, member 52 may be made sufficiently resilient to withstand the resulting springing without being permanently distorted.

FIG. 3 shows the same basic construction as FIG. 1, including means varying the camera lens aperture in response to the presence or absence of a fresh lamp in the socket. In this illustration, those parts designated by primed numerals correspond in construction and function to the like-numbered parts shown in FIG. 1.

In this construction, a diaphragm plate 166 is pivotally mounted on the camera body at 68 and is provided with two apertures 70 and 72 movable into alignment with the camera lens 74. Plate 166 is connected to member 52' by a link 77, whereby the larger aperture 70 is aligned with lens 74 when mask 56' is in the raised position indicative of a fresh lamp in the socket, and the smaller aperture 72 is aligned with the lens when the mask is in the lower "daylight" position. In the device shown in FIG. 1, depressing the shutter release element with a lamp in the socket shifts member 52 simultaneously with the operation of the shutter. Accordingly, in order to position the movable diaphragm plate in response to the position of the movable mask 56', means must be employed to delay the movement of the diaphragm plate until after the exposure has been made. As shown in FIG. 3, this may be accomplished by means of a shutter release mechanism comprising a slidable member 76 attached to the camera body by a rivet 78 and adapted to be moved by a shutter release lever 80 pivoted on the camera at 82 and connected to member 76 by a pin 84 thereon in engagement with a slot 86 in the lever. The lower end of member 76 includes means defining a triangular slot 88 in engagement with a stationary pin 90 on the camera body. As the right end of release member 80 is depressed against the resistance of spring 92, member 76 is raised and a slidably mounted shutter operating member 94 is engaged and moved upwardly thereby to release the camera shutter. A light spring 96 tends to urge member 76 in a clockwise direction around rivet 78 until the movement of the member raises the spring above the rivet, whereupon the member is urged in a counterclockwise direction. In response to the influence of spring 96, the depression and release of lever 80 causes slot 88 to guide the lower end of member 76 about pin 90 in such a manner as to move toe 98 at the upper end of member 76 through a generally triangular path as indicated by arrows, whereby the lower end 100 of member 52' is engaged by the toe during the return stroke of lever 80 to shift mask 56' and diaphragm plate 166 to the "daylight" position. When member 52' has reached its lowermost position, the resilience of member 52' and the play of rivet 78 and pin 90 in their respective slots allow toe 98 to slide off of end 100 as member 76 returns to its initial position.

Although the illustrated embodiment shows a movable diaphragm plate having only two apertures, it is obvious that variations of this mechanism could be employed for adjusting more sophisticated types of diaphragms, for regulating the speed of the shutter, or for disabling an automatic exposure control mechanism, such elements being included in the term "exposure regulating devices," as employed in the appended claims. Likewise, the invention is limited to the employment of the specific type of flash lamp illustrated, but may be adapted for use with any type of lamp having an analogous structure which will cause the lamp engaging member to assume positions corresponding to those illustrated and described.

In FIGS. 4 and 5 I have disclosed another embodiment of the present invention requiring no moving parts and wherein a light signal appears in the viewfinder to indicate to the camera user that a good flash lamp is in the flash circuit and the camera is ready for flash exposures. As shown in FIG. 4 in this embodiment a signal lamp 90 is connected in series with the flash lamp 16' and the battery 38' and in shunt with the flash switch 40' which is closed by actuation of the shutter as is well known. The signal lamp 90 must be of sufficiently high resistance that when it is placed in the circuit the signal lamp will light but the flash lamp will not fire because of the low amperage flowing therethrough. If desired, a signal lamp and resistor combination may be used to obtain the necessary resistance in this branch of the circuit. When the flash switch 40' is closed upon actuation of the shutter the flash lamp will fire and the signal lamp 90 will then be extinguished. The light from signal lamp 90 can be piped into the edge of the field of the viewfinder, as shown in FIG. 5, by a plastic rod 91 whose end is cut off at an angle as shown at 92 to let the light out of the rod so that the end of the rod appears as a bright spot in the finder field. Since the signal lamp will light only when there is a good flash lamp in the circuit, the appearance or absence of the bright spot in the edge of the finder field will clearly indicate to the camera user if his camera is ready for making a flash or daylight exposure. It goes without saying that the signal lamp 90 will be shielded by suitable means, for example, the viewfinder housing, so that light therefrom will not enter the finder directly. Likewise, since the signal lamp will be within the camera housing it must be shielded to prevent light therefrom from fogging the film in the camera. This could be accomplished by a light tight housing surrounding the lamp and into which the entrance end of rod 91 extends to be illuminated. In order to distinguish from any other type of signal which might appear in the finder field to indicate condition of available light or a camera setting, the exit end 92 of rod 91 may be covered with a mask which might have a clear area taking a distinctive form indicative of flash, i.e., a zig-zag pattern symbolizing lightening, etc.

Since these and other modifications of the invention may be made within the scope and spirit of the invention, the foregoing description should be considered as illustrative only and not as limiting the scope of the invention which is defined by the following claims.

I claim:

1. In a photographic camera the combination of a viewfinder; a lamp socket adapted to releasably secure a flash lamp in firing position; a flash signal movable into and out of the field of said viewfinder; means for firing an unfired lamp secured in said socket; and means for moving said flash signal into the field of said viewfinder when a lamp is inserted into said socket and means for moving said flash signal out of the field of said finder upon actuation of said lamp firing means and when there is no lamp in said socket.

2. In a photographic camera the combination of a viewfinder; a flash signal movable between a first position, wherein it is visible in the field of said finder, and a second position, wherein it is not visible in the field of said finder; a shutter; means for actuating said shutter to make an exposure; a flash circuit controlled by actuation of said shutter and including a lamp socket adapted to releasably secure a lamp and connect it into said flash circuit; means for moving said flash signal into said first position in response to an unfired lamp being inserted into said socket; and means for moving said flash signal into said second position when said shutter actuating means is operated to actuate the shutter and make an exposure.

3. A photographic camera according to claim 2 in which said second last means includes a movable sensing member extending into said socket to be engaged and moved by the lamp base upon insertion into said socket to an operative position from which it returns to an inoperative position when said lamp is secured in said socket; a lost motion connection between said sensing member and said flash signal to cause movement of said sensing member to said operative position to move said flash signal into its first position; and said last mentioned means includes a connection between a part of said shutter actuating means and said flash signal for moving said flash signal from its first position to its second position when said shutter actuating means is moved to actuate said shutter to make an exposure.

4. A photographic shutter according to claim 2, including means for ejecting a fired lamp from said shutter, and a connection between said lamp ejecting means and said flash signal for moving said signal to its second position out of the field of said viewfinder when the means is moved to eject a lamp from said socket.

5. In a photographic camera having a lens system for focusing an image of a scene onto a photosensitive surface; means for controlling the exposure of said surface to said focused image; an exposure regulating device adjustable between a first position for flash exposures and a second position for daylight exposures; a socket adapted to releasably secure flash lamp means in firing position; means for firing an unfired flash lamp means secured in said socket in synchronized relation with the exposure controlling means; and means for automatically adjusting said exposure regulating device to said first position when an unfired lamp means is secured in said socket and for automatically adjusting said exposure regulating device to said second position when the lamp means in said socket is fired in synchronized relation with the exposure controlling means.

6. A photographic camera according to claim 5, including a viewfinder; a flash signal associated with said viewfinder to selectively appear in and disappear from the field of said viewfinder; and means for causing said signal to appear in said viewfinder when said exposure regulating device is adjusted to said first position and to disappear from the field of said viewfinder when said exposure regulating device is adjusted to said second position.

7. In a photographic camera having a lens system for focusing an image of a scene onto a photosensitive surface; means for controlling the exposure of said surface to said focused image; an exposure regulating device adjustable between a first position for flash exposures and a second position for daylight exposures; a socket adapted to releasably secure flash lamp means in firing position; means for firing an unfired flash lamp means secured in said socket in synchronized relation with the exposure controlling means; and means for automatically adjusting said exposure regulating device to said first position when an unfired lamp means is secured in said socket and (a) for automatically adjusting said exposure regulating device to said second position when the lamp means in said socket is fired in synchronized relation with the exposure controlling means and (b) for automatically adjusting said exposure regulating device to said second position when there is no lamp means in said socket.

8. In a photographic camera having a lens system for focusing an image of a scene onto a photosensitive surface; an adjustable diaphragm for controlling the exposure of said surface to said focused image; means for adjusting said diaphragm between a first position for flashlight exposures and a second position for daylight exposures; a socket adapted to releasably secure flash lamp means in firing position when inserted thereinto; means for firing an unfired flash lamp means secured in said socket; and means for automatically adjusting said diaphragm to said first position when a lamp means is inserted into said socket and for automatically adjusting said diaphragm to said second position (a) when said lamp means firing means is actuated with a lamp means secured in the socket and (b) when there is no lamp means in said socket.

9. A photographic camera according to claim 8 in which said means for firing a flash lamp means secured in said socket includes a flash shutter having a built-in synchronizer and a trigger mechanism for actuating of the same, and in which the means for automatically adjusting said diaphragm from said first position to said second position includes connecting means between said shutter trigger mechanism and the diaphragm adjusting means which effects such an adjustment of the diaphragm after the shutter has been actuated to make an exposure and during the return stroke of the trigger mechanism to its normal inoperative position.

10. In a photographic camera having a lens system for focusing an image of a scene onto a photosensitive surface: an adjustable diaphragm for controlling the exposure of said surface to said focused image; means for adjusting said diaphragm between a first position for flashlight exposures and a second position for daylight exposures; a socket adapted to releasable secure a flash lamp means in firing position when inserted thereinto; and means for automatically adjusting said diaphragm to said first position when a lamp means is inserted into said socket and for automatically adjusting said diaphragm to said second position when there is no lamp means in said socket.

11. A photographic camera according to claim 10 wherein the diaphragm comprises a pivotable diaphragm vane defining a flash exposure aperture controlling the exposure when the diaphragm vane is pivoted to the first position and a daylight exposure aperture controlling the exposure when the diaphragm vane is pivoted to the second position; and the automatic adjusting means comprises spring means biasing the diaphragm vane to its second position, and an arm responsive to insertion of lamp means to overcome the bias of the spring means and pivot the diaphragm vane to its first position.

References Cited by the Examiner

UNITED STATES PATENTS 3,120,791  2/1964  Bundschuh _____ 95—11

JOHN M. HORAN, *Primary Examiner.*